(12) United States Patent
Liu

(10) Patent No.: US 11,459,009 B2
(45) Date of Patent: Oct. 4, 2022

(54) SHOPPING BAG

(71) Applicant: Li Liu, Zhalantun (CN)

(72) Inventor: Li Liu, Zhalantun (CN)

( * ) Notice: Subject to any disclaimer, the term of this patent is extended or adjusted under 35 U.S.C. 154(b) by 170 days.

(21) Appl. No.: 16/918,664

(22) Filed: Jul. 1, 2020

(65) Prior Publication Data
US 2021/0284219 A1    Sep. 16, 2021

(30) Foreign Application Priority Data

Mar. 11, 2020 (CN) .......................... 202020297935.1

(51) Int. Cl.
*B62B 3/14* (2006.01)
*A45C 13/28* (2006.01)
*A45C 3/04* (2006.01)

(52) U.S. Cl.
CPC .............. *B62B 3/1464* (2013.01); *A45C 3/04* (2013.01); *A45C 13/28* (2013.01); *B62B 3/1472* (2013.01)

(58) Field of Classification Search
CPC ............ B62B 3/1464; B62B 9/26; A45C 3/04
See application file for complete search history.

(56) References Cited

U.S. PATENT DOCUMENTS

| | | | | |
|---|---|---|---|---|
| 4,560,096 A | * | 12/1985 | Lucas | B62B 3/1464 224/543 |
| 4,763,808 A | * | 8/1988 | Guhl | B65F 1/06 220/495.1 |
| 11,192,716 B2 | * | 12/2021 | McBride | B65F 1/06 |
| 2004/0208397 A1 | * | 10/2004 | Yi | B62B 3/1464 383/22 |
| 2006/0001225 A1 | * | 1/2006 | Gurley | B62B 3/1464 280/33.992 |
| 2010/0289234 A1 | * | 11/2010 | Sonnendorfer | G09F 3/20 280/33.992 |
| 2016/0311454 A1 | * | 10/2016 | Hendrick | B62B 3/1464 |
| 2017/0174243 A1 | * | 6/2017 | Bacallao | B65B 67/1227 |
| 2017/0258189 A1 | * | 9/2017 | Goldfinger | A45C 3/045 |
| 2021/0129885 A1 | * | 5/2021 | Roper | A47K 10/20 |

* cited by examiner

Primary Examiner — Derek J Battisti

(57) ABSTRACT

A shopping bag includes a main bag body, two fixing bar members, and at least one hanger member. The main bag body includes two opposite fixing segments and two opposite connecting segments interconnected between the two fixing segments. The two fixing bar members are attached respectively to the two fixing segments. The at least one hanger member includes a housing formed with a fixing groove that is secured with one of the fixing bar members and a respective one of the fixing segments of the main bag body, and first and second retaining grooves. One of the first and second retaining grooves is adapted to be engaged detachably with a longitudinal frame member of a shopping cart.

7 Claims, 4 Drawing Sheets

SHOPPING BAG

CROSS-REFERENCE TO RELATED APPLICATIONS

This application claims priority of Chinese Patent Application No. 202020297935.1, filed on Mar. 11, 2020.

FIELD

The disclosure relates to a shopping bag, more particularly to a reusable shopping bag capable of being used with a shopping cart.

BACKGROUND

An existing reusable shopping bag which can be used with a shopping cart supplied by stores includes a main bag body, two fixing bar members, and two handles. The main bag body provides a storage space, and includes two opposite fixing segments and two opposite connecting segments interconnected between the two fixing segments. The two handles are attached respectively to the fixing segments of the main bag body, and so as the two fixing bar members. When shopping in store, the existing shopping bag can be temporarily fixed to the shopping cart to allow the items to buy to be put into the storage space of the main bag body. After checkout, a user can hold the handles to lift and carry the shopping bag loaded with the purchased items.

However, different stores may use different sizes of shopping carts; the existing shopping bags such as the above-mentioned one lacks adaptation to the various sizes of store shopping cart.

SUMMARY

Therefore, the object of the disclosure is to provide a shopping bag that can be used with shopping carts of different sizes.

According to the disclosure, a shopping bag is adapted to be attached to a shopping cart which has two opposite longitudinal frame members. The shopping bag includes a main bag body, two fixing bar members, and at least one hanger member. The main bag body defines a storage space, and includes two opposite fixing segments and two opposite connecting segments interconnected between the two fixing segments. The two fixing bar members are attached respectively to the two fixing segments. The at least one hanger member includes a housing formed with a fixing groove, a first retaining groove, and a second retaining groove. The fixing groove is secured with one of the fixing bar members and a respective one of the fixing segments of the main bag body. The first retaining groove is located opposite to the fixing groove. The second retaining groove is located between the fixing groove and the first retaining groove. One of the first retaining groove and the second retaining groove is adapted to be engaged detachably with one of the longitudinal frame members of the shopping cart.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
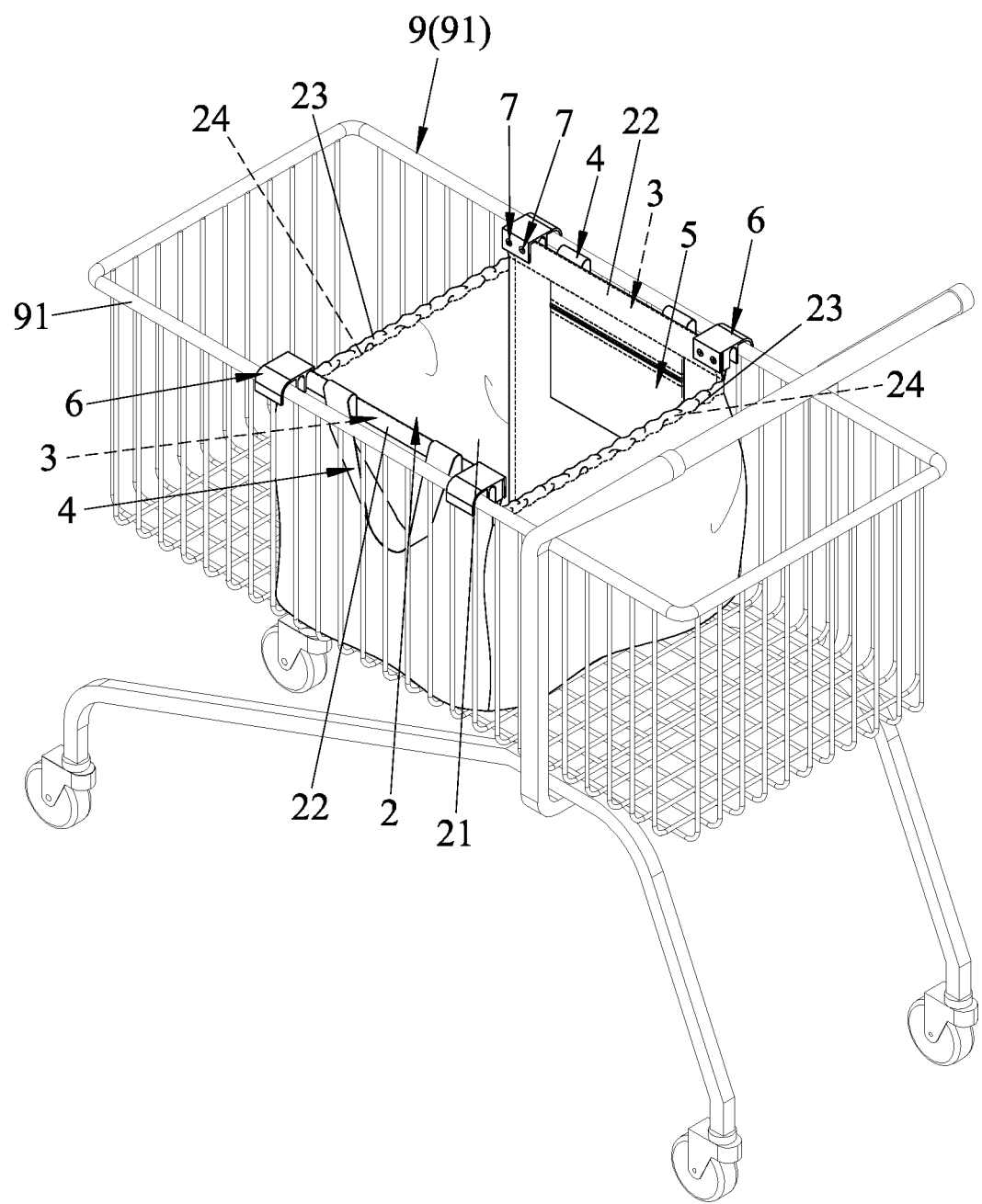
FIG. 1 is a perspective view of an embodiment of a shopping bag according to the disclosure when used with a shopping cart.
Figure 2:
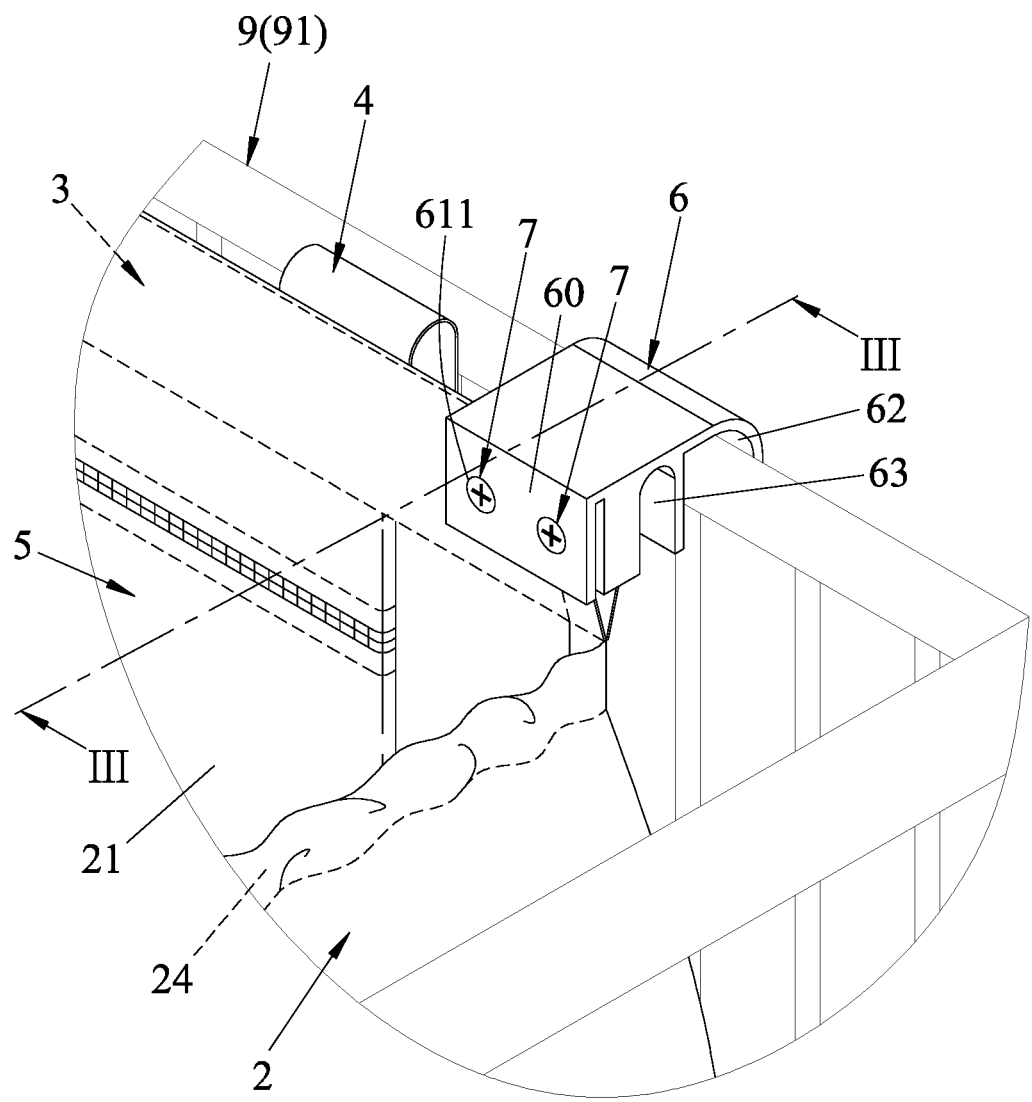
FIG. 2 is a partial enlarged perspective view illustrating a hanger member of the embodiment with a first retaining groove thereof being engaged with the shopping cart.
Figure 3:
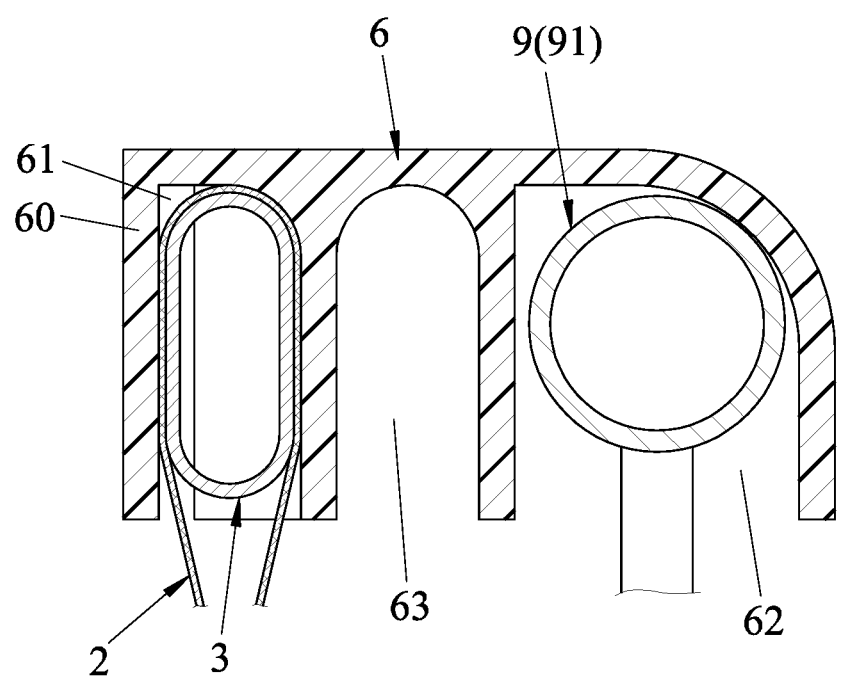
FIG. 3 is a cross-sectional view of the hanger member taken along line III-III in FIG. 2.

As shown in FIGS. 1, 2 and 3, the embodiment of the shopping bag according to the present disclosure is adapted to be attached to a pair of opposite longitudinal frame members 91 of a store shopping cart 9. The shopping bag includes a main bag body 2, two fixing bar members 3, two handles, an accessory pocket 5, a plurality of hanger members 6 and a plurality of fasteners 7.

The main bag body 2 defines a storage space 21, and includes two fixing segments 22 opposite to each other, and two opposite connecting segments 23 interconnected between the two fixing segments 22. In this embodiment, the two fixing segments 22 and the two connecting segments 23 cooperatively define a bag mouth which is in spatial communication with the storage space 21. The main bag body 2 further includes two elastic bands 24 attached respectively to the two connecting segments 23 for making the connecting segments 23 contractible to enable shrinkage of the bag mouth.

The two fixing bar members 3 are attached respectively on the two fixing segments 22 of the main bag body 2. In the present embodiment, each of the fixing bar members 3 is enclosed in a hem of the main bag body extending along a respective one of the fixing segments 22.

The two handles 4 are attached respectively on the fixing segments 22 of the main bag body 2, and are respectively adjacent to the two fixing bar members 3.

The accessory pocket 5 is attached inside of the main bag body 2, and is located adjacent to one of the fixing bar members 3.

The hanger members 6 are disposed on the two fixing bar member 3. Each hanger member 6 includes a housing 60 formed with a fixing groove 61 that is secured with a corresponding one of the fixing bar members 3 and a corresponding one of the fixing segments 22 of the main bag body 2, a first retaining groove 62 that is located opposite to the fixing groove 61, and a second retaining groove 63 that is located between the fixing groove 61 and the first retaining groove 62. Each of the hanger members 6 is provided with at least one Perforation 611 for insertion of a respective one of the fasteners 7 therethrough to secure the hanger member 6 to a corresponding one of the fixing bar members 3 and the corresponding one of the fixing segments 22 of the main body 2. In the present embodiment, there are four hanger members 6. Two of the hanger members 6 are attached to one of the fixing bar members 3, and the other two of the hanger members 6 are attached to the other one of the fixing bar members 3. In other embodiments, it may have only one hanger member 6, which is secured with one of the two fixing bar members 3, or it may have two hanger members 6, which are secured respectively with the two fixing bar members 3. In the present embodiment, the housing 60 of each of the hanger members 6 is formed with two perforations 611, buy may be formed with only one perforation 611 in other embodiments.

Figure 4:
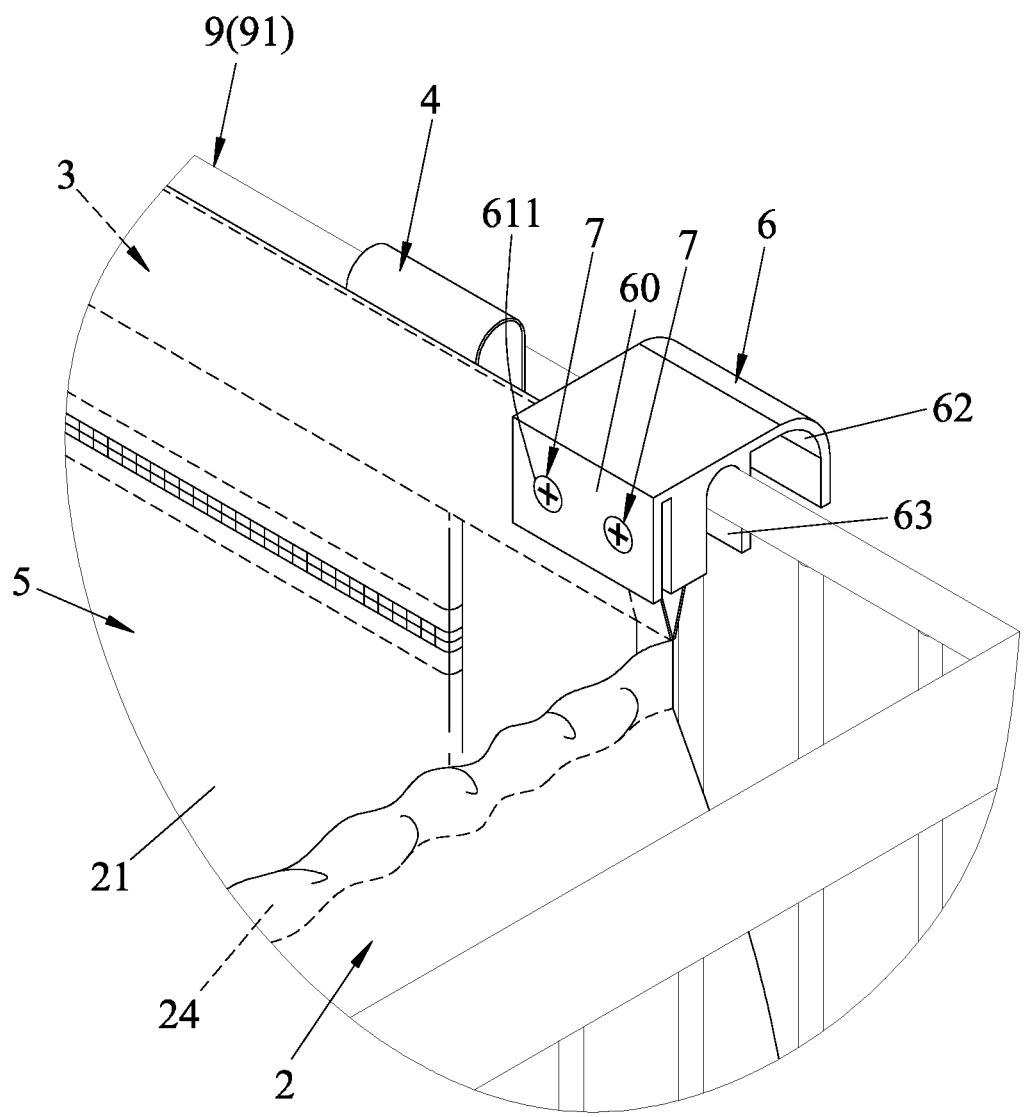
FIG. 4 is a partial enlarged perspective view similar to FIG. 2, illustrating the hanger member of the embodiment with a second retaining groove thereof being engaged with the shopping cart.

Referring to FIGS. 1, 2 and 4, when used with various sizes of the shopping carts 9, either the first retaining groove 62 or the second retaining groove 63 of each of the hanger members 6 can be used to be engaged detachably with the corresponding longitudinal frame member 91 of the shopping cart 9. In case of a larger shopping cart 9 with a relatively larger spacing between the opposite longitudinal frame members 91, the first retaining grooves 62 spaced farther from the main bag body 2 can be chosen to be engaged detachably with the longitudinal frame members 91, instead, the second retaining grooves 63 can be chosen to be engaged detachably with the longitudinal frame members 91 in case of a relatively small shopping cart 9. It is also feasible that the hanger members 6 on one fixing bar member 3 are fastened to one of the longitudinal frame members 91 through the first retaining grooves 62, and the hanger members 6 on the other fixing bar member 3 are fastened to the other one of the longitudinal frame members 91 through the second retaining grooves 63.

When shopping is completed, the hanger members 6 can be removed from the shopping cart 9, and a user can hold the handles 4 to lift and carry the shopping bag loaded with purchased items. Moreover, when the shopping bag is fastened to the shopping cart 9, the elastic bands 24 are stretched to expand the bag mouth of the shopping bag and thereby facilitate the placement of shopping items. After detaching the hanger members 6 from the shopping cart 9, the elastic bands 24 retract to narrow the bag mouth of the shopping bag, thus preventing falling out of the items.

In other embodiments, the shopping bag may have only one hanger member 6 secured to one of the two fixing bar member 3. Therefore, the fixing segment 22 connected to the one of the two fixing bar members 3 and the hanger member 6 can be attached to the corresponding longitudinal frame member 91 through engagement between the first retaining groove 62 or the second retaining groove 63 with the corresponding longitudinal frame member 91; on the other hand, to attach the fixing segment 22 which is connected to the other one of the two fixing bar members 3 without the hanger member 6 to the opposite longitudinal frame member 91, the fixing segment 22 along with the other one of the two fixing bar members 3 need to be rolled down outwardly about the opposite longitudinal frame member 91 till under the opposite longitudinal frame member 91, with the tension of the elastic bands 24, the other one of the two fixing bar members 3 will be squeezed up against the lower edge of the opposite longitudinal frame member 91 to be held in position.

In view of the above description, the foregoing embodiment have the advantages in that: with provision of the hanger members 6 each having a first retaining groove 62 and a second retaining groove 63, the shopping bag can be used with different sizes of shopping carts in a manner that, the first retaining groove 62 spaced farther from the main bag body 2 is used for engaging with the longitudinal frame member 91 of a shopping cart with a larger size, and the second retaining groove 62 being relatively close to the main bag body 2 is used for engaging with the longitudinal frame member 91 of a relatively small shopping cart.

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A shopping bag adapted to be attached to a shopping cart which has two opposite longitudinal frame members, said shopping bag comprises:
   a main bag body that defines a storage space, and that includes two opposite fixing segments and two opposite connecting segments interconnected between said two fixing segments;
   two fixing bar members that are attached respectively to said two fixing segments; and
   at least one hanger member that includes a housing formed with
      a fixing groove that is secured with one of said fixing bar members and a respective one of said fixing segments of said main bag body,
      a first retaining groove that is located opposite to said fixing groove, and
      a second retaining groove that is located between said fixing groove and said first retaining groove, one of said first retaining groove and said second retaining groove being adapted to be engaged detachably with one of said longitudinal frame members of said shopping cart;
   wherein said housing of said at least one hanger member is provided with a perforation, said shopping bag further comprising a fastener that is inserted through said perforation to secure said hanger member to said one of said fixing bar members and said respective one of said fixing segments of said main body.

2. The shopping bag as claimed in claim 1, further comprising two handles disposed respectively adjacent to said fixing bar members.

3. The shopping bag as claimed in claim 1, further comprising an accessory pocket attached inside of said main bag body and located adjacent to one of said two fixing bar members.

4. The shopping bag as claimed in claim 1, further comprising two elastic bands attached respectively to said two connecting segments of said main bag body.

5. The shopping bag as claimed in claim 1, wherein said at least one hanger member includes two hanger members attached respectively to said two fixing bar members.

6. The shopping bag as claimed in claim 1, wherein said at least one hanger member includes a plurality of hanger members attached to said fixing bar members.

7. The shopping bag as claimed in claim 6, wherein said at least one hanger member includes four hanger members, two of said hanger members being attached to one of said fixing bar members, the other two of said hanger members being attached to the other one of said fixing bar members.

\* \* \* \* \*